(12) United States Patent
Kampers

(10) Patent No.: US 7,967,982 B2
(45) Date of Patent: Jun. 28, 2011

(54) SYSTEM FOR REMOVING OIL FROM A WATER SURFACE

(75) Inventor: Gerrit Kampers, Puttershoek (NL)

(73) Assignee: Koseq B.V., Puttershoek (NL)

( * ) Notice: Subject to any disclaimer, the term of this patent is extended or adjusted under 35 U.S.C. 154(b) by 0 days.

(21) Appl. No.: 12/066,778

(22) PCT Filed: Aug. 10, 2006

(86) PCT No.: PCT/NL2006/000415
§ 371 (c)(1),
(2), (4) Date: Apr. 22, 2008

(87) PCT Pub. No.: WO2007/032661
PCT Pub. Date: Mar. 22, 2007

(65) Prior Publication Data
US 2008/0251463 A1   Oct. 16, 2008

(30) Foreign Application Priority Data

Sep. 13, 2005   (NL) .................................... 1029936

(51) Int. Cl.
*E02B 15/04* (2006.01)
(52) U.S. Cl. ..................... 210/242.3; 210/923
(58) Field of Classification Search ............ 210/776, 210/170.09, 170.11, 242.3, 923, 242.1
See application file for complete search history.

(56) References Cited

U.S. PATENT DOCUMENTS

| | | | | | |
|---|---|---|---|---|---|
| 3,348,690 | A | * | 10/1967 | Cornelissen | 210/242.3 |
| 3,970,556 | A | * | 7/1976 | Gore | 210/242.1 |
| 3,983,034 | A | * | 9/1976 | Wilson | 210/776 |
| 4,014,795 | A | * | 3/1977 | in'tVeld | 210/923 |
| 4,116,833 | A | * | 9/1978 | Stagemeyer et al. | 210/776 |
| 4,264,444 | A | * | 4/1981 | Bronnec | 210/242.3 |
| 4,294,698 | A | | 10/1981 | Bronnec | |
| 4,511,470 | A | * | 4/1985 | Ayroldi | 210/242.3 |
| 4,514,299 | A | * | 4/1985 | Ayroldi | 210/242.3 |
| 4,554,070 | A | * | 11/1985 | Jordan | 210/242.3 |
| 5,043,065 | A | * | 8/1991 | Propp | 210/242.3 |
| 5,217,611 | A | * | 6/1993 | Ayroldi | 210/242.3 |
| 5,308,510 | A | * | 5/1994 | Gore | 210/776 |
| 5,824,231 | A | | 10/1998 | Blomberg | |

FOREIGN PATENT DOCUMENTS

| | | |
|---|---|---|
| EP | 0 129 279 | 12/1984 |
| EP | 0 601 198 | 6/1994 |
| EP | 1 439 119 | 7/2004 |
| WO | 2006 037829 | 4/2006 |

* cited by examiner

*Primary Examiner* — Christopher Upton
(74) *Attorney, Agent, or Firm* — Oblon, Spivak, McClelland, Maier & Neustadt, L.L.P.

(57) ABSTRACT

A skimming system for removing a floating layer from a water surface. The skimming system includes at least one guide element that is movable relative to the floating layer, which guide element includes at least one unit that catches the floating layer. The at least one removal unit includes at least one collecting container that is detachably attached to the guide element. The collecting container is furthermore vertically adjustable, so that it is not only easy to detach and exchange the collecting container but that it is moreover possible to position the floating layer removal means at a desired depth in or below the floating layer. In this way an optimum removal of the floating layer can be realized. The inlet of the collecting container is present at a location where the extent to which water is mixed with the floating layer is minimal.

16 Claims, 6 Drawing Sheets

SYSTEM FOR REMOVING OIL FROM A WATER SURFACE

FIELD OF THE INVENTION

The present invention relates to a skimming system for removing a floating layer from a water surface, said system comprising at least one guide element that is movable relative to the floating layer, which guide element is provided with at least one floating layer removal unit.

The present invention also relates to a floating layer guide element for use in the skimming system.

The present invention furthermore relates to the use of the skimming system in removing a floating layer containing oil, chemicals, plants or algae from a water surface.

DISCUSSION OF THE BACKGROUND

Such skimming systems provided with guide elements are generally known, they are used in case of calamities, for example, for removing substances, usually chemical substances such as oil or oil-like contaminations, from the water surface on which said substances form a so-called floating layer.

A skimming system of the above type is known from EP-A-0 059 717. The skimming system that is known therefrom comprises at least one guide element that is movable relative to the floating layer. The guide element is connected by means of tow cables to the oil slick removal unit that is towed through the water by a vessel. While said unit is being towed through the water, oil is concentrated in a unit in the form of a fixed collecting box, from where the oil/water mixture is pumped into one or more storage units.

A drawback of the known system and the known method of removing oil from the water surface is that they are not always very effective in optimally removing various types of oil in practice.

SUMMARY OF THE INVENTION

The object of the present invention is to provide an improved skimming system by means of which the floating layer on the water surface can be removed in a more effective manner.

In order to accomplish that object, the skimming system according to the invention is characterised in that said at least one floating layer removal unit is provided with at least one collecting container that is detachably attached to the guide element.

The advantage of the skimming system according to the invention is that the collecting container can be exchanged and be substituted for another collecting container. This is furthermore advantageous in particular when the removal unit is provided with floating layer removal means that are generally attached to the collecting container, such as brushes (usually driven brushes), paddles, discs, pumps and/or overflow means. The fact is that it is possible in that case to obtain the degree of flexibility as regards the most optimum way of handling the removal of the oil slick that is very important in practice. It has become apparent that the effectiveness of the oil removal operation depends inter alia on factors such as: the nature and the composition of the floating layer, the viscosity, the layer thickness, the direction of the current, the velocity at which the floating layer moves, the degree to which the layer is mixed with water, the amount of air bubbles in the oil, the pumpability, and the local conditions, such as the waves, the temperature, the force and the direction of the wind, the environment etc. When the present invention is used, the desired floating layer removal means can be advantageously selected by exchanging the collecting container to which said means are already attached. Moreover, the aforesaid factors considered to be of paramount importance for the local situation can be optimally taken into account when making the aforesaid selection.

Exchanging the collecting container with removal means attached thereto for the purpose of carrying out an oil removing operation geared to the situation at hand is not only easy, but it is also cheaper and can be carried out in less time on site than detaching the old floating layer removal means and fitting the new one, which was previously necessary. A quick exchange in particular of the floating layer removal means in question is moreover important in order to be able to quickly repair any malfunctions on site.

Another embodiment of the skimming system according to the invention is characterised in that the skimming system comprises adjusting means by which the removal unit or the collecting container can be adjusted for height.

If the collecting container is vertically adjustable, the removal means attached thereto are automatically adjusted for height as well upon vertical adjustment thereof. Said vertical adjustment not only makes it easier to detach and exchange the collecting container, but in addition the floating layer removal means can be moved to a desired depth in or below the floating layer so as to realise an optimum removal of the floating layer, taking into account the aforesaid local factors. In all the situations in which brushes, paddles, discs and/or overflow means provided with an overflow wall are used, said vertical adjustment is advantageous in practice.

When such overflow means are used, it is possible to adjust the oil-water ratio by adjusting the height of the floating layer removal means. Because not all oil types exhibit the same degree of pumpability under certain circumstances, said pumpability can be influenced by admitting more water or less water into the collecting container together with the floating layer by adjusting the height, which water is subsequently pumped out.

Another embodiment of the skimming system according to the invention is characterised in that said at least one collecting container has an inlet that is provided at a location where water and floating layer are mixed to a minimum extent.

The inventor has also realised that an important reason for the discrepancy between the theoretically obtainable effectiveness of an oil slick removing operation and that which is actually realised in practice is the fact that turbulences and short waves occur at the location where the floating layer is being collected and pumped out, in particular at the interface between oil and water. These factors lead to oil and water being locally mixed in an uncontrolled ratio.

The turbulences in the collected oil that lead to the aforesaid undesirable mixing are often caused by the movement both of the vessel, which displaces comparatively much water, and of the guide elements, which are usually supported on pontoons and which have less draught than the vessel. The presence of an excess of air in the oil may also be caused by the fact that the collected oil is sucked in and forced out with too much force, however, which also has an adverse effect on the effectiveness. If the collecting point of the oil and the discharge point are located too close to the side wall of the vessel, this may lead to the aforesaid turbulence and short waves at the location of the collecting point under certain circumstances, for example sailing against the current, incoming wind or (overly) rapid skimming. For that reason the collecting point must be provided at the location on the guide element where the extent to which water and/or air are mixed with the floating layer is minimal. The idea is that the interface between oil and water and/or air will only be affected to a small extent and will still be reasonably flat when the location of the collecting point or intake point is suitably selected, so that oil can be removed in an effective manner. In addition, the dimension of the oil layer to be pumped out will be known more precisely in that case and it will be easier to gear the vertical adjustment of the system thereto, as a result of which the level efficiency will be enhanced even further.

Another embodiment of the skimming system according to the invention is characterised in that said at least one guide element forms a system of one or more interconnectable guide elements extending at specific angles relative to each other.

Such a system can be towed by a vessel via tow cables, but it may also be provided close to the vessel or, for example in case of a river, be fixed to the river banks by means of tow cables. The guide elements may be interconnected to obtain a V-formation or a reverse V-formation in such cases, depending on which formation produces the best results. Flexibility in the use of the skimming system according to the invention also applies as regards the selection of the location of the removal unit(s) with detachable collecting containers in said possibly harmonica-shaped formation.

Furthermore preferably, said at least one guide element is a rigid construction, and the interconnectable guide elements are hinged, so that the guide elements, will take up little space during transport, in particular on the deck of a vessel, in folded-up or collapsed condition or detached from each other.

The advantage of this is furthermore that a compact skimming system that can be rendered operational in a short time is obtained, which system is nevertheless capable of spanning a wide oil removal area. In addition, collecting containers may be disposed at several locations in the guide elements.

BRIEF DESCRIPTION OF THE DRAWINGS

The skimming system according to the present invention will now be explained in more detail with reference to the figures below, in which like parts are indicated by the same reference numerals, and wherein.

DESCRIPTION OF PREFERRED EMBODIMENTS

Figure 1:
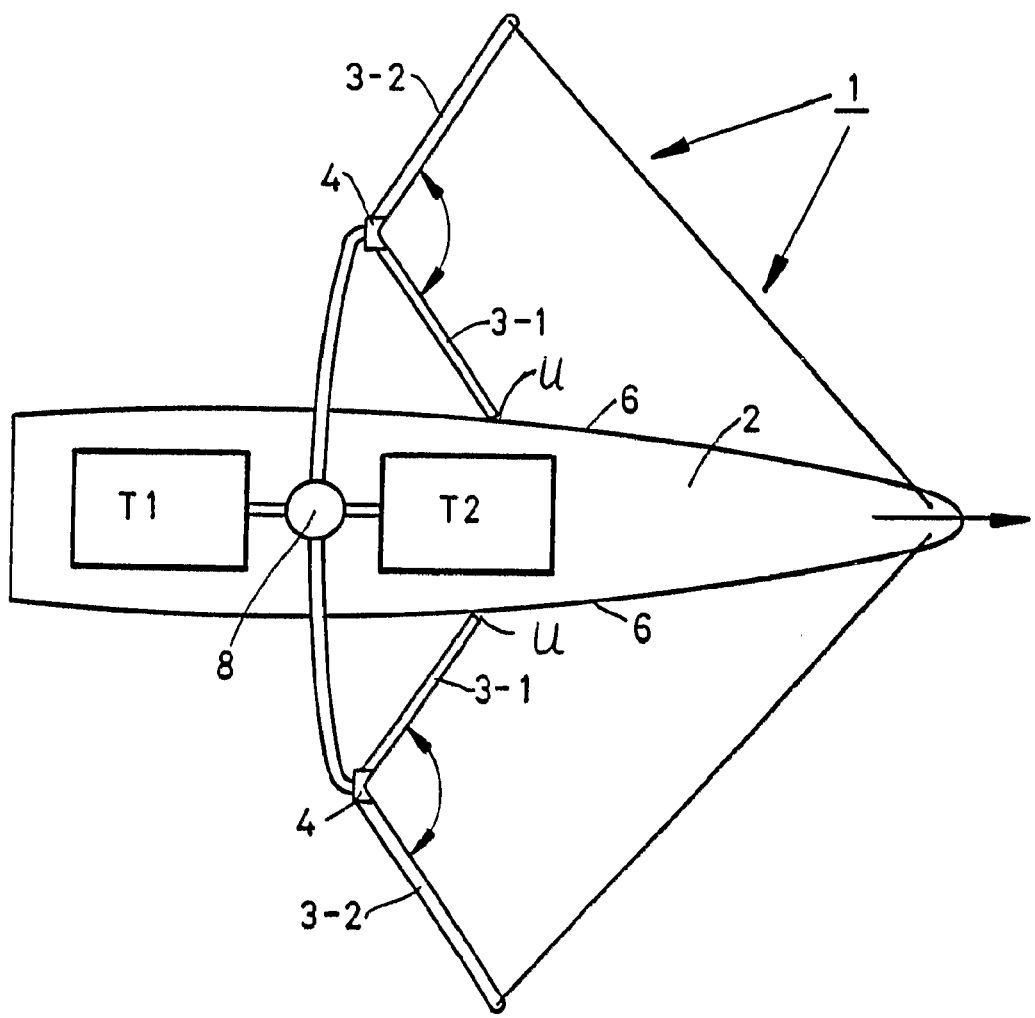
FIG. 1 is a schematic representation of the skimming system according to the invention, with the two skimming elements in unfolded condition.
Figure 3:
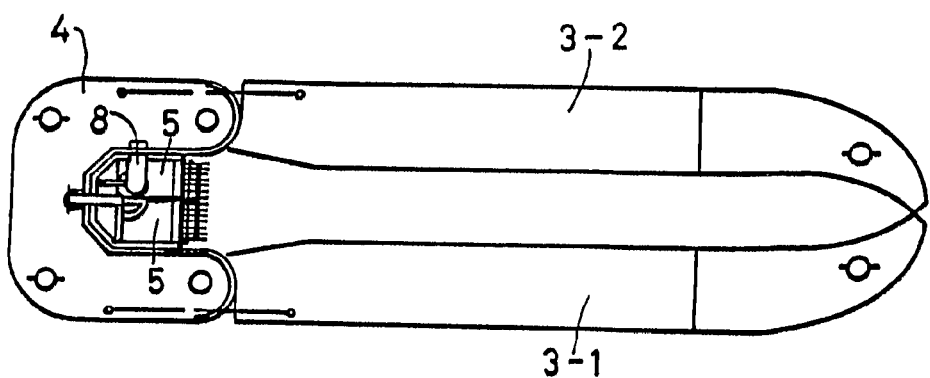
FIG. 3 shows the guide element of FIG. 2 in folded condition.
Figure 2:
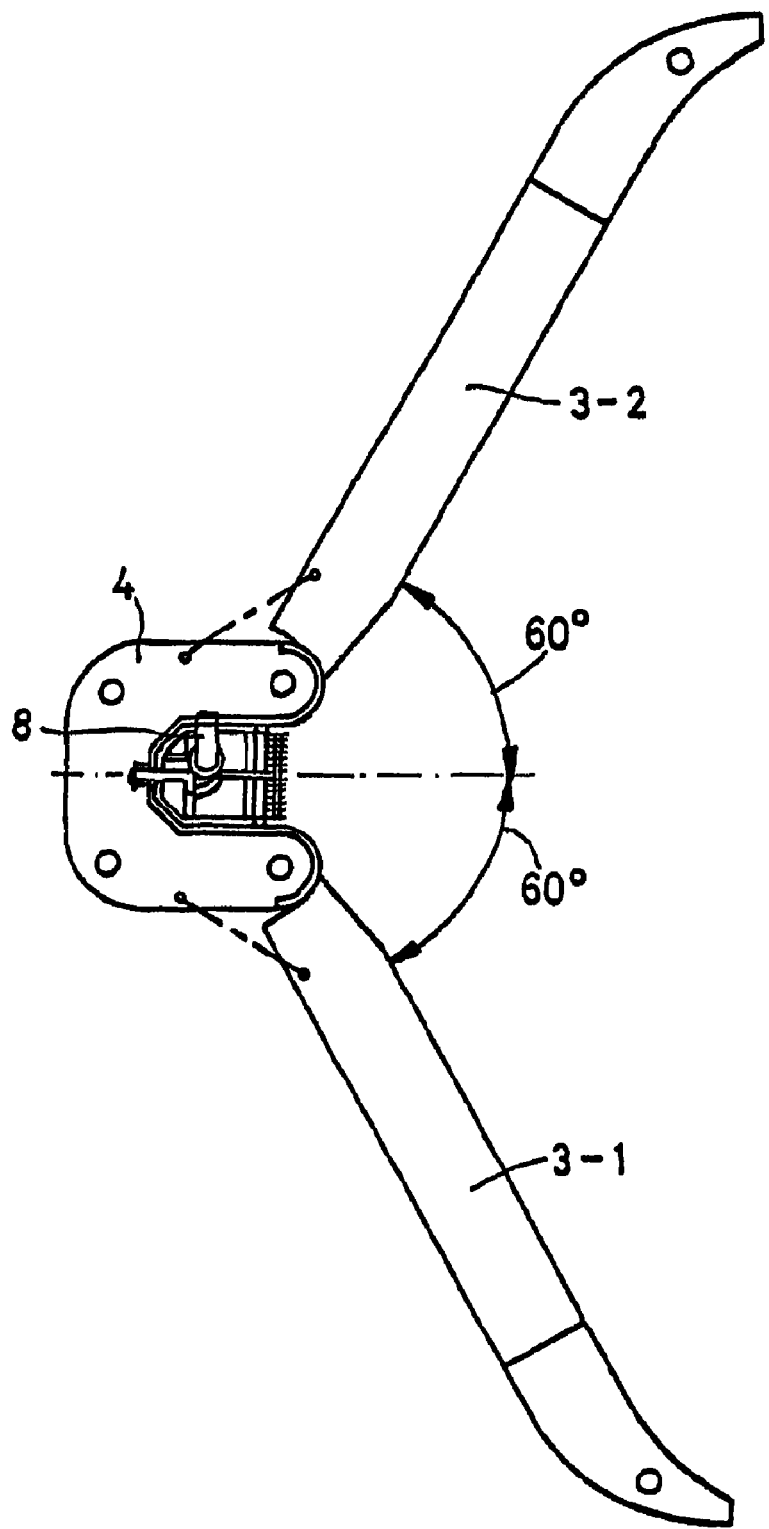
FIG. 2 shows a possible embodiment of an unfolded guiding system for use in the skimming system that is shown in FIG. 1.

FIG. 1 schematically shows a skimming system 1, in this case comprising a vessel 2 and one or more series of floating layer guide elements 3-1, 3-2, which are coupled together and to the vessel 2. It is also possible to tow said one or more of series of guide elements 3 beside or behind the vessel 2 by means of tow cables or, for example in case of contamination of a waterway, to fix a system of guide elements 3 to the banks by means of tow cables, in which case a propulsion vessel is not needed but advantageous use is made of the current in the water. In FIG. 1, the vessel 2 moves the skimming system 1 provided with the guide elements through the water in the direction indicated by the arrow, and a contaminating substance that floats on the surface, e.g. oil, to be referred to below as "floating layer", collects between the guide elements 3-1 and 3-2. In a special embodiment, the shell of the vessel may form part of the floating layer guide elements 3 in that the vessel 2 moves forward at an angle in that case.

The opening angle between said one or more guide elements 3-1, 3-2 is preferably about 120°, or smaller, but it depends on the skimming velocity and the width of the floating layer. In case of a smaller skimming angle, a higher skimming velocity can be obtained, and conversely. In case of the aforesaid skimming angle, a velocity of 2 miles/hour is achievable if fixed-structure guide elements are used. Such guide elements usually have a strong lattice construction, so that a stable and rigid structure is obtained, which enables an effective guidance of the moving floating layer along the walls of the guide elements 3. One or more float bodies are provided in the guide element 3 in a manner that is known per se, so that the guide element is self-floating.

Figure 4:
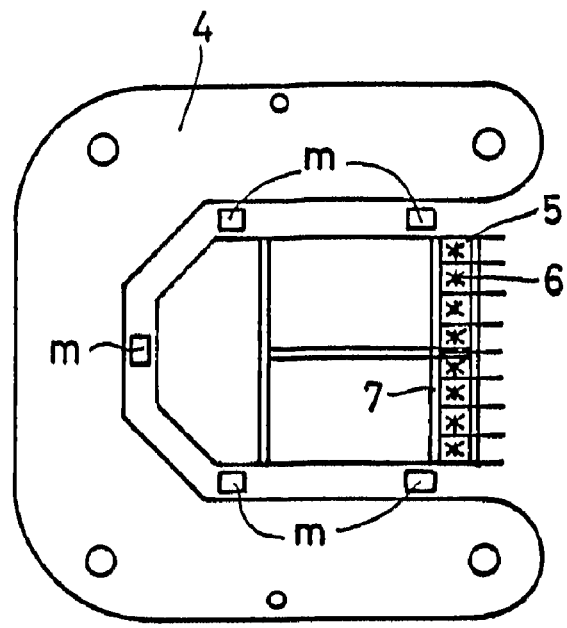
FIG. 4 shows a further elaborated representation of a removal unit for use in the skimming system that is shown in FIG. 1.

The oil passes between the guide elements 3 towards a removal unit 4 as shown in FIG. 4, which is configured as a so-called "skimmer housing". Disposed in the removal unit 4 is a collecting container 5 that is vertically adjustable to a desired depth, into which the floating layer consisting of oil and water flows when an overflow system is used. Further floating layer removal means 6 (only shown schematically), such as moving brushes, paddles, discs, by means of which the concentrated floating layer is moved into the collecting container 5, may be attached to the collecting container 5. When discs or brushes are used, the oil is collected and removed in pure form, i.e. without any additional free water, in that the oil adheres thereto as a result of its hydrophobic action, which oil is subsequently scraped off and lands in the collecting container, from which it is then pumped out.

Figure 5:
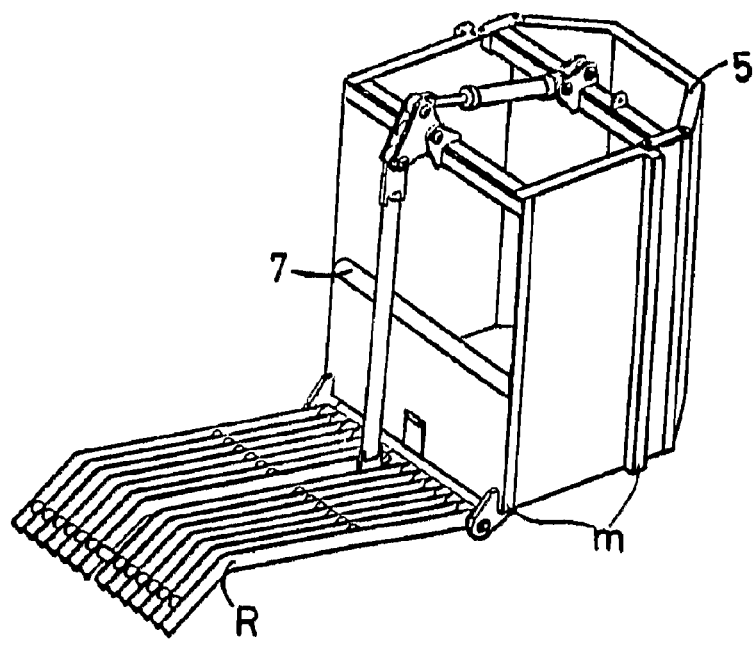
FIG. 5 is a perspective view of a collecting container for use in the removal unit of FIG. 4.

The drawings of FIGS. 4 and 5 schematically show an overflow system with an overflow wall 7. Via the overflow wall 7, which may be adjusted for height together with the collecting container 5, the floating layer flows into the container 5 in the layer thickness as set and in the desired oil-water ratio. According to another possibility, only the overflow wall 7 is provided with means (not shown) for adjusting only the wall 7 (in that case) for height. The schematically indicated means M for guiding and vertically adjusting the collecting container 5 are manually driven in some cases, but usually they are driven hydraulically or possibly pneumatically, and they may be operated by remote control. Suitable pressure and/or current velocity sensors connected to the adjusting means M may be provided near the overflow wall 7 and/or in the collecting container 5 for influencing the influx of the floating layer momentarily by adjusting the height of the collecting container 5 accordingly.

FIG. 5 shows the separate—detached—collecting container 5, which may be provided with a lifting eye, via which the container 5 can in principle be adjusted for height by means of a hoisting device. The container 5 as shown herein is provided with a hinged grid R, which, in the raised position thereof, collects debris floating on or in the layer of oil. In FIG. 5 the grid R is shown in lowered condition, when it is lowered a little further, however, the collected debris will be carried along by the current under the container 5 and thus be removed from the inlet into the container.

The skimming system 1 is provided with one or more pumps that are connected to the collecting container 5. The pumps 8 may be present on one or more of the guide elements 3, but they may also be present on the collecting container 5, on the shore and/or on the vessel 2. Examples of suitable pumps 8 are: vacuum pumps, force pumps, suction pumps and/or so-called ejectors. In practice, hydraulic plunger pumps or force pumps are frequently used for pumping highly viscous substances. When highly viscous oil is to be pumped, it will be advantageous to pump it with comparatively more water, so that the capacity of the companies is used more efficiently. The actual vertical adjustment of the overflow system may be adapted to this desired ratio. Said pumping takes place into or out of the storage tanks T1, T2 that are present on the vessel 2.

The inlet of the collecting container 5, where the removal means 6 are present, is provided at a position on the guide element 3 where no excessive mixing of water and/or air with oil takes place. Generally, said position is located a considerable distance inter alia from the side walls and the propeller of the vessel 2, so that the turbulence, the current, waves or wave reflections produced near or by the vessel 2 and/or the skimming frames 3 do not have an adverse or destabilising effect on the desired final ratio in particular of oil and water to be pumped.

In the embodiment of the skimming system 1 that is shown in FIG. 1, the collecting container 5 is positioned approximately halfway along the V-shaped (in this embodiment) system of the guide elements 3-1, 3-2, in the apex of the V-shape, where the concentration point of the floating layer is located. The guide element 3 may be hinged in several points. The apex of the V-shape may point—as a reverse V—in a direction opposed to the direction of the current as indicated by an arrow, and the system may have a harmonica shape or a W-shape. Furthermore, the removal unit 4 may in principle be positioned at any desired location or locations. When a reverse V-formation is used, the oil is driven apart by the moving elements 3 and the concentration points of the floating layer are located at the ends of the two legs of the V. In that case the removal unit 4, usually together with the collecting container 5, will be present in said points.

In case of a malfunction of one of the guide elements 3, the defective or damaged guide element can readily be exchanged for another by means of a hoisting tool. The guide elements 3, which may be interconnectable for forming larger systems, if desired, and which may be collapsible, take up a little space on board the vessel 2, they can be stored individually or in collapsed or folded-together condition, whilst large skimming widths can be realised.

One or more tow cables may be provided between the skimmer housing 4 and/or one end of one of the arms 3 for the purpose of keeping the skimming system 1 stable during movement from the water containing the various types of oil and make it easier to maneuver the skimming system 1.

In addition to the foregoing it is noted that it is advantageous, in particular when strong winds prevail, to only provide one or more guide elements 3-1, 3-2 on the lee side instead of on both sides. After all, there is less turbulence in the water/oil surface on the lee side, especially at the interface between water and oil.

If the guide element 3 is provided with one or more float bodies, as already explained in the foregoing, the element 3 will be self-floating. FIG. 1 shows that the tow cables hold the skimming system 1 in place, in this case against the wall of the vessel 2. The system 1 moves free from the vessel 1 in that case, as a result of which the relative movements of the vessel 2 and the skimming system 1 take place independently of each other, at least in vertical direction. This enables the skimming system 1 to move along with the local swell in the floating layer, and as a result a higher degree of precision regarding the layer thickness of the floating layer that is being removed can be achieved in combination with the vertically adjustable wall 7 and/or the container 5. This has a positive effect on the oil/water ratio of the mixture that is being pumped out and it is advantageous with a view to filling the storage tanks T1 and T2 in an efficient manner.

Advantageously, a rubber protection bumper is provided at the location where the end U of a guide element 3-1 makes contact with the wall of the vessel 1 that moves independently of the element 3-1. By making the protection bumper hollow and passing a pulling wire or chain therethrough, for example, the rubber protection bumper can be pulled firmly around the (usually curved) end of the element and be held in position thereon by exerting a pulling force on said wire or chain.

Figure 6A:
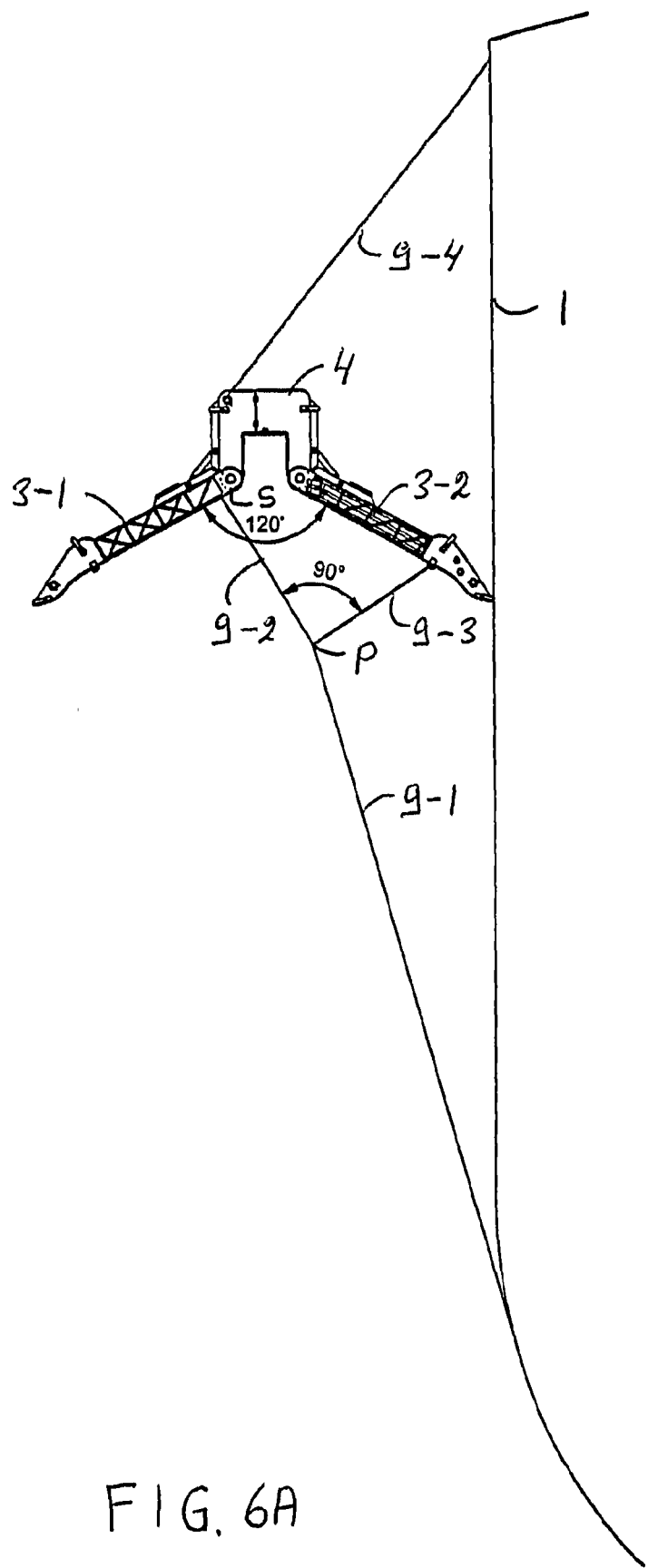
FIGS. 6A, 6B and 6C show the skimming system according to the invention with opening angles of 120°, 90° and 60°, respectively, between the guide elements thereof.
Figure 6B:
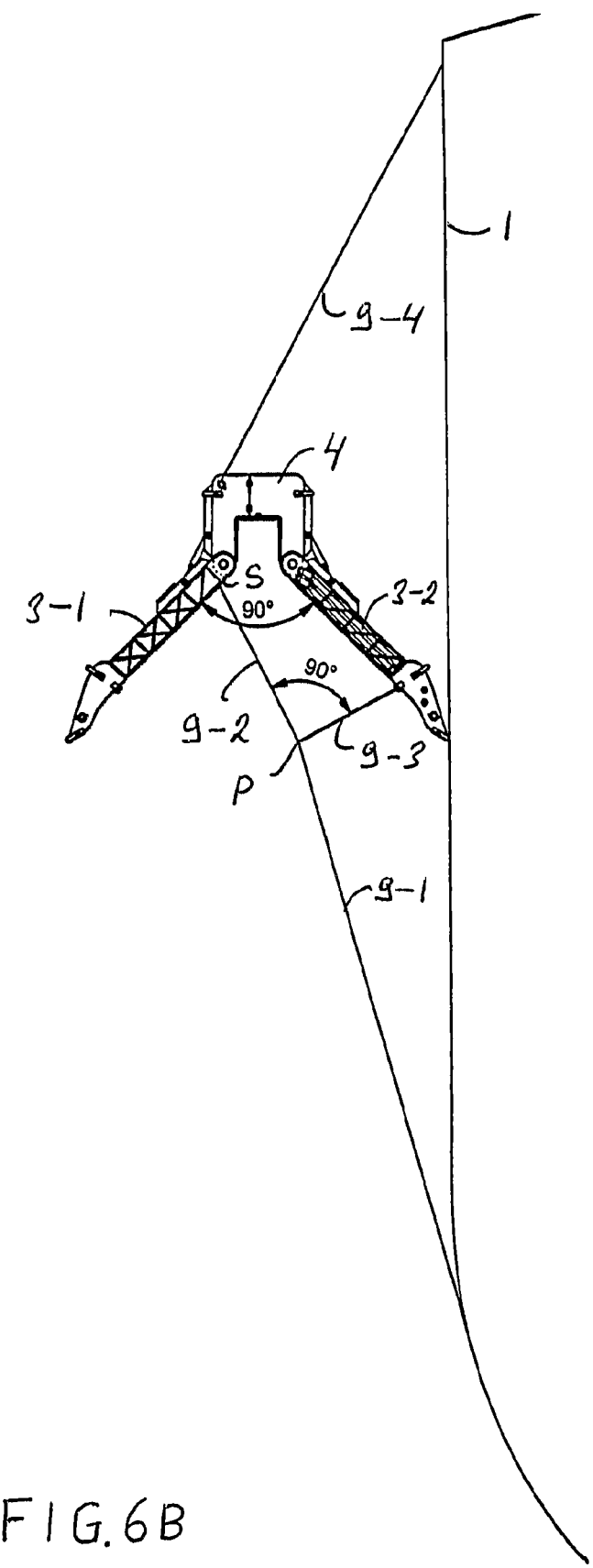
Figure 6C:
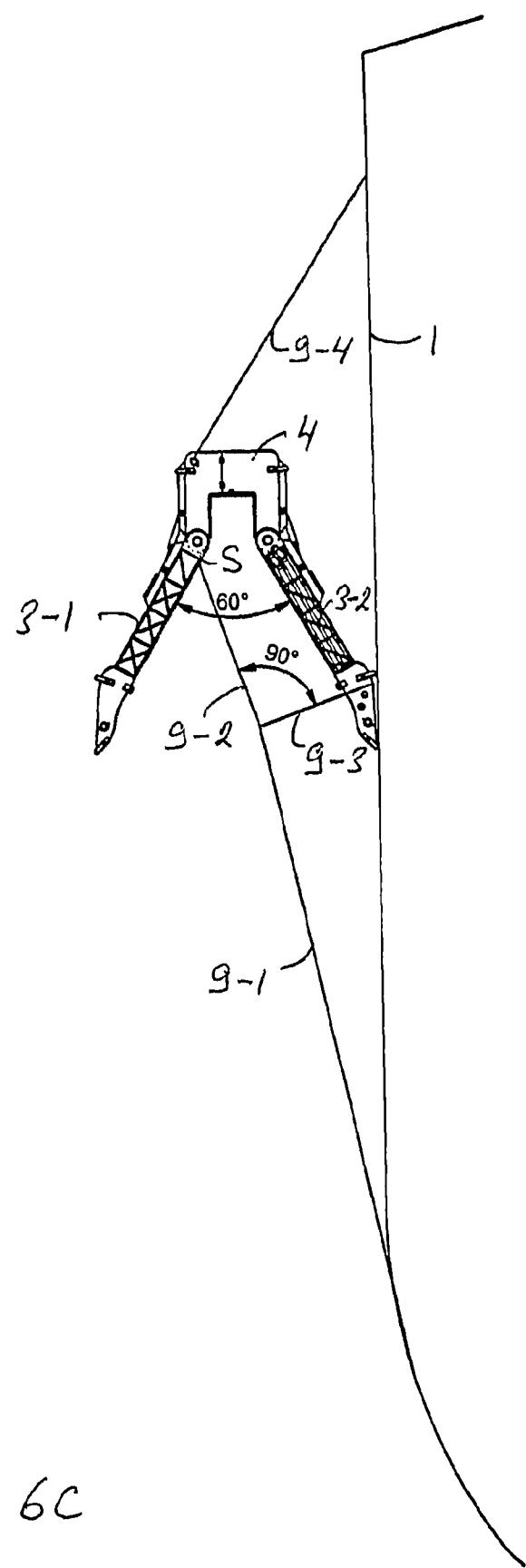

FIGS. 6A, 6B and 6C show opening angles of 120°, 90° and ° C., respectively, between the guide elements 3-1 and 3-2 of the skimming system 1. The figures show how a tow cable 9-1, which is fastened to the front side of the vessel 1, branches off into two (in this case) tow cable parts 9-2 and 9-2 at the location of a branch point P, which tow cable parts are fastened to the one guide element 3-1 that may be present, at the location of the hinge point S thereof, and to the end of the other guide element 3-2. If no element 3-1 is present, the tow cable part 9-2 may be fastened to the removal unit 4. Securing the skimming system 1 by tow cables in this manner and towing it behind or along the vessel 1 appears to enable easier maneuvering when compared to the system of FIG. 1. Furthermore it is easier to hold the skimming system in position against the vessel. This obtains in particular when the system is moved through the water at an angle as already explained before, because this requires less navigational skill on the part of the person at the rudder of the vessel 1. It is advantageous if the tow cable parts include an angle of about 90° with each other at the location of the branch point P. The length of the various tow cables and tow cable parts is preferably adjustable, so that an optimum skimming result can be obtained by flexibly anticipating the constantly changing conditions and factors on site with due professional skill.

Providing it does not add to the self-weight of the skimming system 1, a drive shaft may be provided at the hinge point S, if desired, at an angle of 90° thereto, making it possible to realise a certain degree of independence of movement between the guide elements 3-1 and 3-2.

The invention claimed is:

1. A skimming system for removing a floating layer from a water surface, the system comprising:
   at least one floating layer guide element that is movable relative to the floating layer, which guide element includes at least one floating layer removal unit,
   wherein the at least one floating layer removal unit includes attached thereto at least one collecting container that has attached thereto a floating layer removal means including at least one of brushes, paddles, discs, pumps, and/or overflow means,
   wherein the at least one floating layer removal unit further includes a driven guide means for momentarily adjusting a height of the at least one collecting container with its attached removal means relative to the at least one floating layer removal unit, and
   wherein the at least one collecting container with its attached removal means is further exchangably provided in the at least one floating layer removal unit.

2. A skimming system according to claim 1, wherein the at least one floating layer guide element is configured so that at least one floating layer concentration point is formed along the at least one floating layer guide element.

3. A skimming system according to claim 2, wherein the at least one floating layer removal unit or the attached at least one collecting container is provided at the location of the at least one floating layer concentration point.

4. A skimming system according to claim 1, wherein the driven guide means includes a wall with an adjustable height on the at least one collecting container at a point of influx of the floating layer.

5. A skimming system according to claim 4, further comprising a hinged grid positionable in raised or lowered positions in front of the adjustable height wall.

6. A skimming system according to claim 1, wherein the skimming system further comprises one or more pumps connected to the at least one floating layer removal unit or to the at least one collecting container.

7. A skimming system according to claim 6, wherein the at least one pumps are provided on the at least one guide element, on the at least one floating layer removal unit, on the at least one collecting container, on a shore, and/or on a vessel sailing along.

8. A skimming system according to claim 6, wherein the one or more pumps comprise a vacuum pump, a force pump, a suction pump, and/or an ejector.

9. A skimming system according to claim 1, wherein the one or more floating layer removal unit and/or collecting container are provided in and/or between the at least one guide element.

10. A skimming system according to claim 1, wherein the at least one collecting container includes an inlet provided at a location where water and the floating layer are mixed to a minimum extent.

11. A skimming system according to claim 1, wherein the at least one floating layer guide element forms a system of one or more interconnectable guide elements extending at specific angles relative to each other.

12. A skimming system according to claim 11, wherein the one or more interconnectable floating layer guide elements extending at specific angles relative to each other are hinged.

13. A skimming system according to claim 1, wherein the removal means comprises a hinged grid.

14. A skimming system according to claim 1, wherein a shell of a vessel forms part of the at least one floating layer guide element.

15. The skimming system according to claim 1, wherein the floating layer includes oil, chemicals, plants, or algae from a water surface.

16. A floating layer guide element configured for use in a skimming system for removing a floating layer from a water surface, which guide element is movable relative to the floating layer and comprising:
- at least one floating layer removal unit;
- wherein the at least one floating layer removal unit includes attached hereto at least one collecting container that has attached thereto a floating layer removal means including at least one of brushes, paddles, discs, pumps, and/or overflow means,
- wherein the at least one floating layer removal unit further includes a driven guide means for momentarily adjusting a height of the at least one collecting container with its attached removal means relative to the at least one floating layer removal unit, and
- wherein the at least one collecting container with its attached removal means is further exchangably provided in the at least one floating layer removal unit.

\* \* \* \* \*